UNITED STATES PATENT OFFICE.

OREN H. SHAFER, OF PETOSKY, MICHIGAN.

SAFETY-VALVE FOR WATER-JACKETS.

No. 868,022.        Specification of Letters Patent.        Patented Oct. 15, 1907.

Application filed March 13, 1907. Serial No. 362,120.

To all whom it may concern:

Be it known that I, OREN H. SHAFER, a citizen of the United States, residing at Petosky, in the county of Emmet and State of Michigan, have invented certain new and useful Improvements in Safety-Valves for Water-Jackets; and I do hereby declare the following to be a full, clear, and exact description of the invention, such as will enable others skilled in the art to which it appertains to make and use the same.

This invention relates to safety valves for use in connection with the water jackets of gas and other similar engines, to prevent the said jackets from bursting in cold weather; and it consists in the novel construction and combination of the parts hereinafter fully described and claimed.

In the drawings, Figure 1 is a longitudinal section through the safety valve. Fig. 2 is an end view of the same.

A is a tube having a screwthreaded portion $a'$ at one end for engaging with a screwthreaded hole in the water jacket of the engine. The tube is preferably formed of two sections which are connected together by a screwthreaded portion $b$. The end section $A'$ is provided with a valve seat C, and the other section is provided with a projecting ring or shoulder $c$.

D is a valve which is pressed against the seat C by a spring $d$ arranged between the back of the valve and the shoulder $c$. The tube is made in two sections in order that the said valve and spring may be placed within it, and in order that the requisite pressure may be given to the valve by screwing the tube sections together. The outer tube section is provided with a plug E, and $e$ is a packing of asbestos inserted in the outer tube section between the plug E and the shoulder $c$. The plug $e$ has a small hole $f$ for the escape of air or water. The tube is secured within the water jacket of the engine, and when the water freezes and expands, the valve is forced backward from its seat. The tube is made of considerable length so that the valve may be in contact with the water which is the last to become frozen.

What I claim is:

In a relief-valve for a water-jacket, the combination, with a tube formed of two sections, the inner section of the said tube having a valve seat at its inner end, and the outer section of the said tube having a fastening device at its outer end for securing it to a water-jacket and having also an inwardly projecting ring at its inner end portion, a chamber for asbestos fiber being formed between the said ring and the outer end of the said tube; of a perforated plug closing the said chamber, a valve normally bearing on the said valve-seat, and a spring arranged between the said ring and valve.

In testimony whereof I have affixed my signature in the presence of two witnesses.

OREN H. SHAFER.

Witnesses:
   G. B. LOWE,
   F. S. LYON.

No. 868,023. PATENTED OCT. 15, 1907.
F. SIMPSON.
LIQUID MEASURE.
APPLICATION FILED FEB. 10, 1906.
6 SHEETS—SHEET 1.
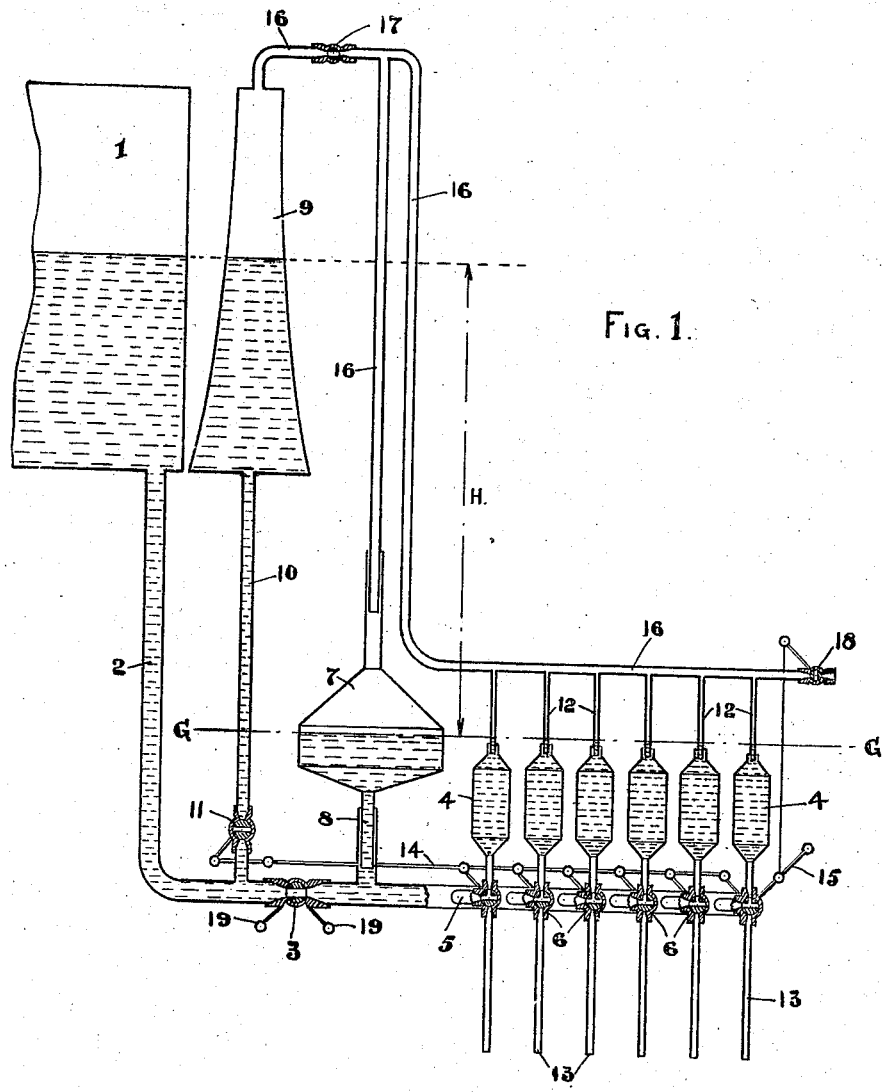

No. 868,023. PATENTED OCT. 15, 1907.
F. SIMPSON.
LIQUID MEASURE.
APPLICATION FILED FEB. 10, 1906.
6 SHEETS—SHEET 2.
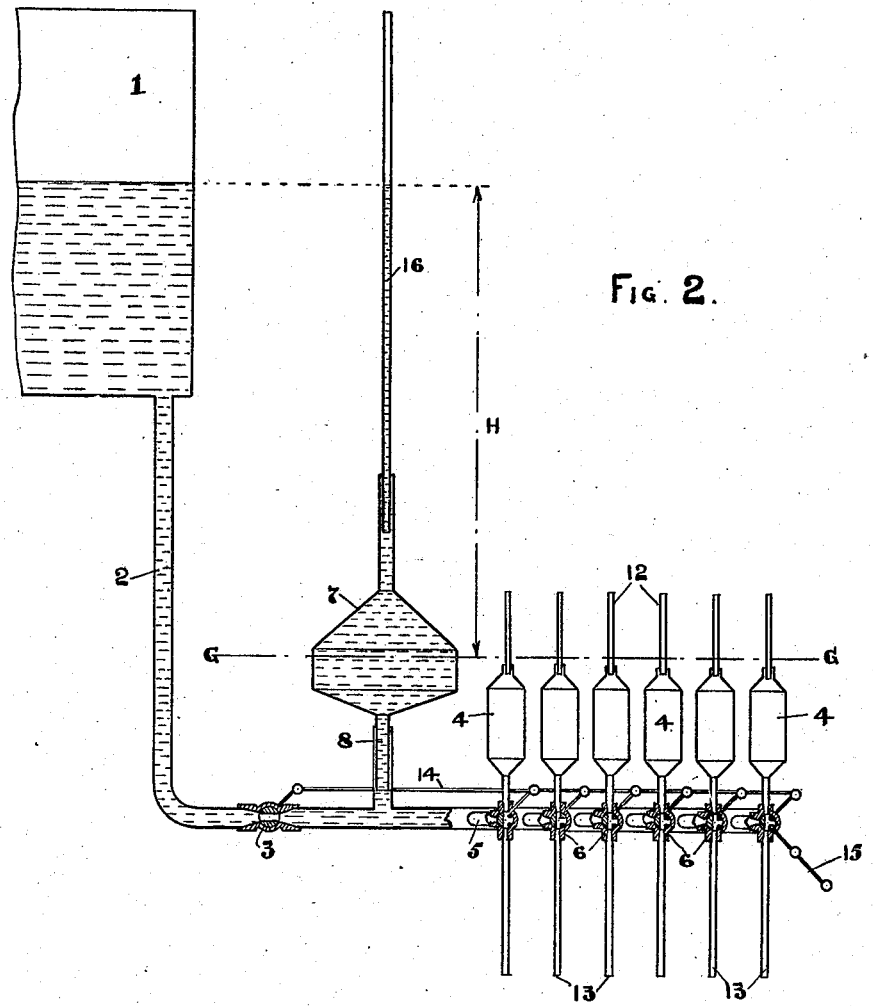

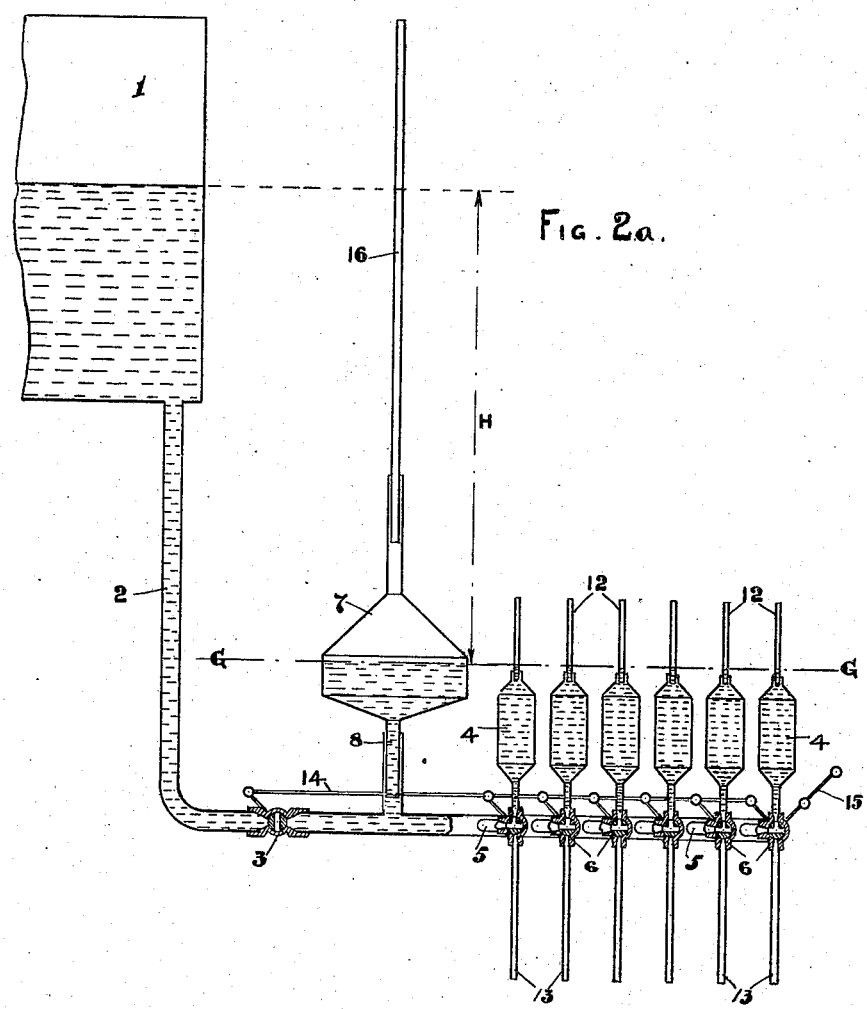

No. 868,023. PATENTED OCT. 15, 1907.
F. SIMPSON.
LIQUID MEASURE.
APPLICATION FILED FEB. 10, 1906.
6 SHEETS—SHEET 4.
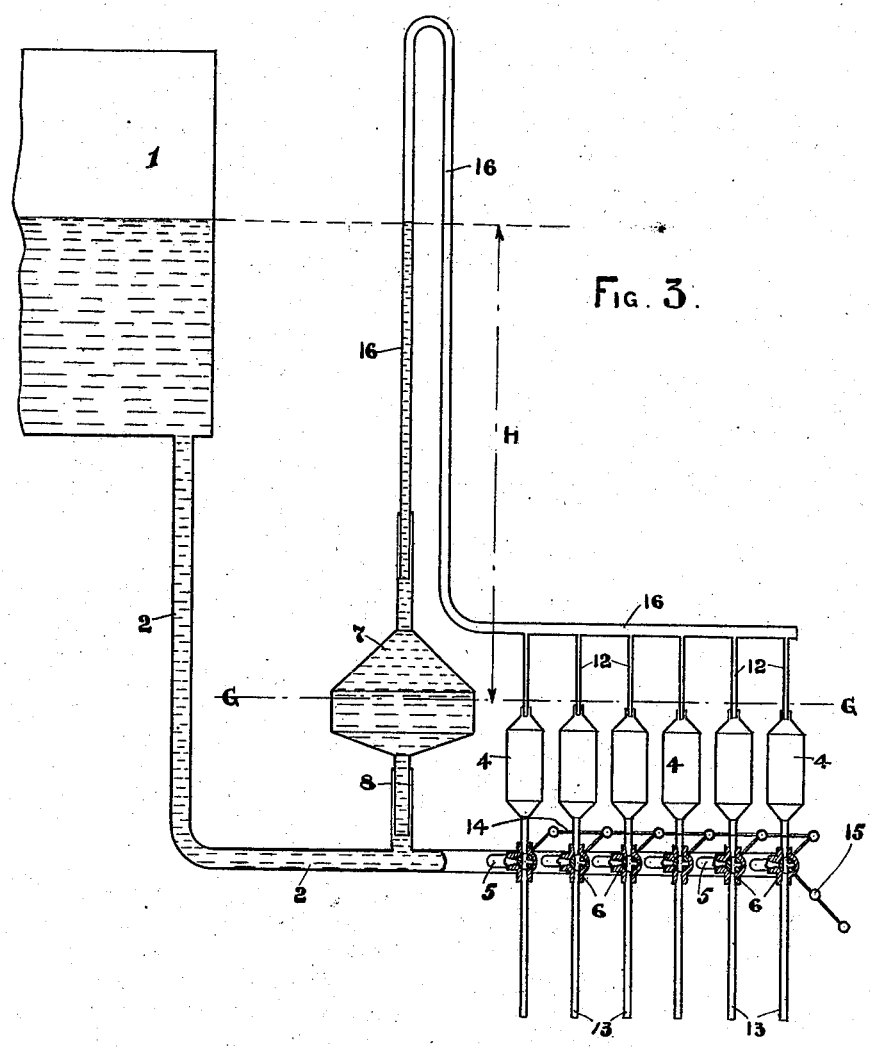

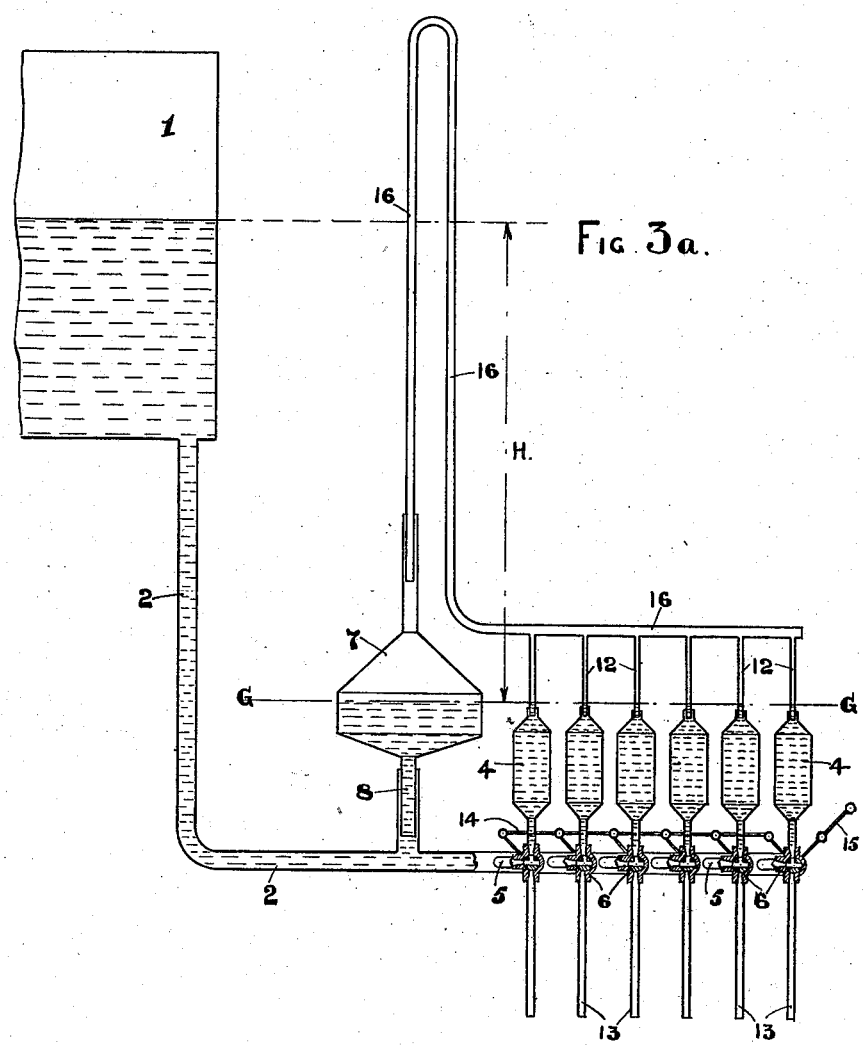

No. 868,023. PATENTED OCT. 15, 1907.
F. SIMPSON.
LIQUID MEASURE.
APPLICATION FILED FEB. 10, 1906.
6 SHEETS—SHEET 6.
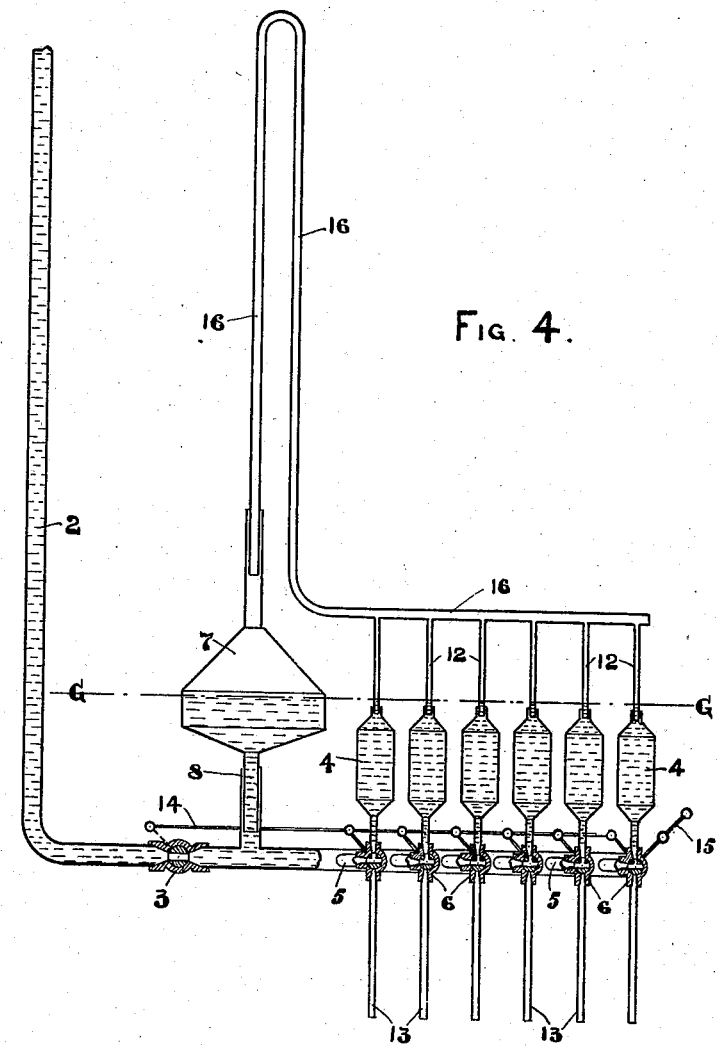

UNITED STATES PATENT OFFICE.

FRED SIMPSON, OF BUENOS AYRES, ARGENTINA.

LIQUID-MEASURE.

No. 868,023.　　　　　Specification of Letters Patent.　　　　Patented Oct. 15, 1907.

Application filed February 10, 1906. Serial No. 300,477.

*To all whom it may concern:*

Be it known that I, FRED SIMPSON, a subject of the King of Great Britain, and a resident of Buenos Ayres, Argentina, at present temporarily residing at Blundellsands, near Liverpool, in the county of Lancaster, England, have invented certain new and useful Improvements in Liquid-Measures, of which the following is a specification.

This invention has reference to apparatus for delivering liquids in measured quantities, and the object is to provide an apparatus which shall effect the desired result with a high degree of accuracy independent of the care or skill of the operator; which shall be adapted to deal rapidly with large quantities of liquid; and which shall be cheap, simple and little liable to derangement.

Broadly described, my invention comprises one or a number of measuring vessels filled and emptied from below and extended above by slender tubes; a vessel which I term a regulating vessel of comparatively large horizontal cross-section, charged from the source of supply and communicating with the measuring vessels while the latter are filling; means for automatically insuring that the level of the liquid in the regulating vessel at the time the measuring vessels are full will be substantially constant under varying conditions; and the necessary connecting pipes and cocks for operating the apparatus.

The drawings forming part of this specification are diagrammatic in character, as the structural details are so simple as to call for no special description.

Figure 1 shows the apparatus in its most complete form, in vertical section, and Figs. 2, $2^a$, 3, $3^a$ and 4 show the apparatus in vertical section, with parts omitted and serving to facilitate the description of the action according to the different ways in which the apparatus may be used.

1 is the store tank containing the liquid to be delivered, 2 is the supply pipe leading from it and fitted with stop cock 3.

4 are the measuring vessels communicating below with the supply pipe through the branch pipes 5 and three-way cocks 6; 7 is what I term the regulating vessel, also communicating below through the pipe 8 with the supply pipe 2, and 9 is what I term the compensating vessel, communicating also with the supply pipe 2 through the pipe 10 and the stop cock 11.

The measuring vessels 4 which may be of any desired number, are extended above by the slender tubes 12, preferably of glass, and when the measuring vessels contain the assigned volume to be delivered, the liquid level stands in these tubes at what I term the gage level, indicated by the line G, G.

The three-way cocks 6 have their middle branches connected to the branch supply pipes 5, their upper branches to the measuring vessels 4, and their lower branches to the delivery pipes 13. All the respective levers of the cocks 6 are articulated together by the links 14, so that they are adapted to be operated simultaneously by the hand lever 15, as indicated in dotted ines.

The regulating vessel 7 may be of any desired form, but it should be of uniform cross-sectional area for a short distance above and below the gage level G, G, and this area should be much greater than that of the tubes 12. The pipe 8 connecting the regulating vessel to the supply pipe 2 may be made with a telescopic fluid-tight joint as indicated, but this is not essential.

The compensating vessel 9 is made of curved contour, for a reason which will be understood when the action is described, and the top of this as well as that of the regulating vessel 7 and the tubes 12 are all in communication through the air pipes 16. If the pipe 8 be made with a telescopic joint, there must be a similar joint in the pipe 16 connected to the top of the regulating vessel, as indicated, or a portion of this pipe may be made flexible. A stop cock 17 is fitted in the pipe 16 as shown, to cut off communication with the compensating vessel, and a second cock 18, opening to the atmosphere, is fitted in a convenient position to enable its lever to be linked to the hand lever 15. This linkage is so arranged that the cock 18 is opened when the measuring vessels are discharging or almost discharged, and closed while they are filling, and the linkage is made detachable. The cock 11 is linked to the rod 14 so that this cock is closed while the measuring vessels are filling, and open while they are discharging, and the lever is detachable from the linkage. The cock 3 is provided with a double arm lever 19, either arm of which may be connected at will to the link 14; in the one case, the cock 3 is closed while the measuring vessels 4 are filling, and open while they are discharging, and in the other case the conditions are reversed; or the cock may be disconnected from the linkage and left continuously open as shown in Fig. 1. All the vessels and connections are made liquid and air tight.

The apparatus may be used in several ways, depending upon the conditions and the degree of accuracy demanded.

The action will be most readily grasped by supposing in the first instance that the head of supply is moderate and that the highest degree of accuracy is not required. In that event, the cock 11 is disconnected from the link 14 and closed, and the cock 17 is also closed, thus isolating the compensating vessel which is not required under the circumstances; the air cock 18 is also disconnected from the linkage and left open. The cock 3 is connected to the link 14 so that it is closed while the measuring vessels are filling and open while they are discharging. The state of affairs will now be clearly understood by referring to the diagrammatic views Figs. 2 and $2^a$ in which the parts thrown out of action are omitted, the former illustrating the discharging and the latter the filling of the measuring vessels.

In Fig. 2, the cocks 6 being closed to supply and open to discharge, the measuring vessels will empty through the pipes 13 into the vessels intended to receive the liquid, and the cock 3 being open, the regulating vessel 7 with its air pipe 16 will fill up to the level of the liquid in the tank 1. The hand lever is now thrown over as in Fig. 2ª, closing the cock 3 and the measuring vessels to discharge but opening the latter to the regulating vessel. The liquid will now fall in the regulating vessel and rise in the measuring vessels until it stands at the common level G, G, which I term the gage level. This level is fixed near the bases of the air pipes 12, and indicates the level at which the measuring vessels contain the proper volume. The hand lever is now again thrown over to complete the cycle by refilling the regulating vessel and discharging the measuring vessels.

It is clear that the volume, above the gage level, of the regulating vessel with its air pipe 16, up to the level of the liquid in the store tank, must be equal to the aggregate volume delivered by the measuring vessels, and having been once adjusted, no care is required on the part of the attendant further than to allow time between the successive operations of the hand lever for the vessels to fill or empty as the case may be.

The volume received by each measuring vessel will only be affected in an inappreciable degree by any probable variation in the head of the liquid in the store tank. Suppose, for instance, that the air pipe 16 is $\frac{1}{4}$ inch diameter, and the regulating vessel is 20 inches diameter at the gage level. Then an increase of 100 inches in the head H will only raise the gage level by $\frac{1}{64}$ of an inch, and as this difference of level appears in the tubes 12, say $\frac{1}{4}$ inch diameter, the increased volume received by each measuring vessel will only be .0008 cubic inch, or $\frac{1}{50000}$ of a pint. This illustrates one of the distinguishing features of the invention. The regulating vessel determines the level of the liquid in the air pipes of the measuring vessels when the latter are filled. Owing to the large area of the regulating vessel at the gage level in relation to that of its air pipe 16, any variation in the head causes a very slight variation of the gage level, and this corresponds to an inappreciable variation of volume in the small air pipes 12 of the measuring vessels. It will be noted that the effect of momentum of the fluid is practically eliminated, as the effective head which drives the liquid from the regulating vessel into the measuring vessels, gradually falls to zero as the measures are filled.

Telescopic joints are indicated in the regulating vessel pipes, these may be used if the measuring vessels are exchanged for others of different capacity. The regulating vessel may then be raised or lowered until the surface of the liquid stands at the gage level in the tubes 12; this adjustment being once made, the regulating vessel is fixed and requires no further attention.

When volatile or sterilized liquids are dealt with, it is of great advantage to prevent access of the atmosphere. Under these circumstances the cock 3 is disconnected from the linkage and left open, the cock 18 is also disconnected from the linkage and left closed; the cocks 11 and 17 are also left closed, thus isolating the compensating vessel 9 as before.

The state of affairs will now be clearly understood by referring to the diagrammatic views Figs. 3 and 3ª, in which inoperative parts are omitted. It will be noticed that the air pipes now form a closed system. In the position shown in Fig. 3, the measuring vessels are empty and open to discharge, the air in the air pipes is at atmospheric pressure, and the liquid flows into the regulating vessel, rising in the air pipe 16 to the level of the liquid in the store tank. The hand lever is now thrown over as in Fig. 3ª, opening the measuring vessels to the supply pipe and closing them to discharge, the liquid now rises in the measuring vessels and falls in the regulating vessel until it reaches a common level, and the capacity of the regulating vessel is so arranged in relation to the capacity of the measuring vessels and the air pipes, that this common level is the gage level G G, the pressure of the inclosed air and that due to the head H then being in equilibrium. The attendant has thus only to move the hand lever, and the level of the liquid automatically adjusts itself to the correct height each time the measures are filled. It will be noted that when the measuring vessels fill, they withdraw their charge in part from the vessel 7 and in part from the store tank, and if the vessel 7 remain at the same height as in Figs. 2 and 2ª, the gage level will be slightly higher than in those figures; the gage level is however adjustable by altering the level of the vessel 7, the telescopic joints in the pipes of the vessel 7 permit this adjustment. The volume of the vessel 7 is thus calculated:—Let A = atmospheric pressure, expressed as a head of the liquid dealt with. K = height of top of store tank 1 above the level G G. M = total capacity of the measuring vessels 4, below the level G. G. V. = volume of the regulating vessel 7 and its air pipe from the level G G up to the height K. C = combined volume of the air pipes above the level G G but exclusive of that included under V. Then, $$V = \frac{AM - Kc}{A + K}$$

As before, any probable variation in the head H, affects the gage level very slightly and the corresponding variation in the volume of the liquid in the small air pipes 12 is very small.

In addition to preventing access of the atmosphere to the liquid, there is an advantage from the fact that both the filling and emptying are effected under pressure, so that the action is rapid. The regulating chamber begins to fill under the full head H, which gradually diminishes to zero as the filling proceeds, thus minimizing the fluid momentum effect. The measures commence to fill under the full head, and although they are still under the head H when the filling is completed, the effective head driving the liquid into the measuring vessels becomes zero as they fill up, because the pressure of the inclosed air is then in equilibrium with the head H. Similarly they commence to discharge under the head H, and finish at atmospheric pressure, thus as before, minimizing the momentum effect.

When the highest degree of accuracy is desired, the compensating vessel 9 is brought into action by opening the cock 17 and connecting the cock 11 to the linkage 14, as shown in Fig. 1, except that the cock 18 is still left disconnected and closed. By the action of the linkage the cock 11 is closed, as already stated, while the measuring vessels 4 are filling, but is opened